Dec. 9, 1941.    B. D. BEDFORD    2,265,717
ELECTRIC TRANSLATING APPARATUS
Filed June 28, 1940
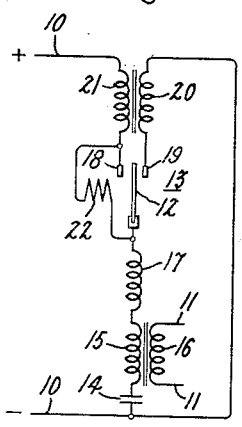
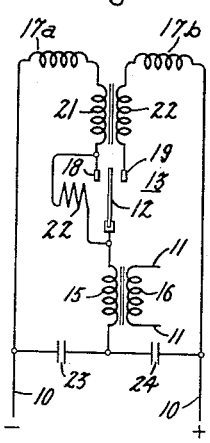
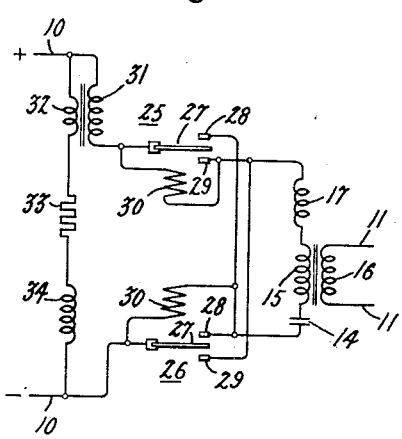
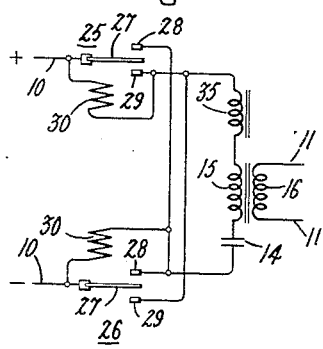
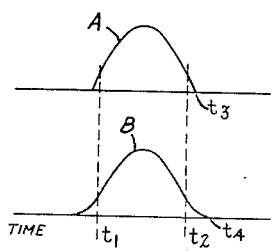
Inventor:
Burnice D. Bedford,
by Harry E. Dunham
His Attorney.

Patented Dec. 9, 1941

2,265,717

UNITED STATES PATENT OFFICE 2,265,717

ELECTRIC TRANSLATING APPARATUS

Burnice D. Bedford, Schenectady, N. Y., assignor to General Electric Company, a corporation of New York Application June 28, 1940, Serial No. 343,015

10 Claims. (Cl. 175—365)

My invention relates to electric translating apparatus, and more particularly to electric translating apparatus including circuit interrupting means.

It is often desirable to interchange electrical energy between circuits of different electrical characteristics such as, for example, a direct current circuit and an alternating current circuit. Electric translating apparatus including switching means for effecting such interchange of electrical energy between circuits of different characteristics have been provided but difficulty has been experienced in providing such apparatus which is reliable in operation and at the same time may be produced at a cost commensurate with its electrical rating. In electrical translating apparatus employing mechanical switching means it has been particularly difficult to reduce sparking at the switch contacts sufficiently to insure reliable operation without utilizing electrical equipment in the circuit which increases the cost of the apparatus to an undesirable extent.

It is an object of my invention to provide a new and improved electric translating apparatus for transferring energy between circuits of different electrical characteristics.

It is another object of my invention to provide an improved electric translating apparatus which is reliable in operation and economical to manufacture.

It is a further object of my invention to provide a new and improved electric translating apparatus utilizing mechanical switching means which is characterized by decreased sparking at the switch contacts and improved operating efficiency.

In accordance with the illustrated embodiments of my invention I provide an improved electric translating apparatus including mechanical switching means in which a series oscillating circuit including a nonlinear inductive impedance is connected in series with the switching means to control the flow of current therethrough in an improved manner. In one embodiment of my invention I provide a reversing switch interconnected between the opposite sides of a direct current source and a series resonant circuit including the primary winding of an output transformer. Included in the circuit with the mechanical switching means and cooperating with the inductance and capacitance of the oscillating circuit is a nonlinear impedance for modifying the wave shape of the current of the oscillating circuit so that the switching means may be operated when the current therethrough is at or near zero. Apparatus embodying the broad idea of employing a saturable inductive impedance and means cooperating therewith to control the flow of current through circuit controlling means just prior to and during the circuit controlling operation thereof is disclosed and claimed in my copending application Serial No. 113,581, filed December 1, 1936, and assigned to the same assignee as the present invention.

For a better understanding of my invention reference may be had to the following description taken in connection with the accompanying drawing and its scope will be pointed out in the appended claims. In the drawing, Fig. 1 diagrammatically illustrates an embodiment of my invention as applied to an electric translating apparatus for transmitting energy between a direct current circuit and a single-phase alternating current circuit; Fig. 2 is a diagrammatic representation of a modification of the arrangement shown in Fig. 1; Figs. 3 and 4 illustrate embodiments of my invention in which a vibratory switching means of the reversing type is employed; and Fig. 5 illustrates the variation with time of the current in the oscillating circuit of Figs. 1 to 4 as compared with a sinusoidal current at the natural frequency of the oscillating circuit.

In Fig. 1 of the drawing I have shown my invention applied to an electric translating apparatus for transferring energy between a direct current circuit 10 and an alternating current circuit 11. One of the direct current lines 10 is connected to the vibratory element 12 of a mechanical switching device 13 through a series oscillating circuit including a capacitor 14, the primary winding 15 of a transformer having its secondary winding 16 associated with the alternating current circuit 11, and an inductance 17. The vibratory switch 13 is provided with a pair of stationary contacts 18 and 19 which are arranged to be engaged alternately by the movable element 12. The stationary contact 19 is connected to the same line of the direct current circuit as the capacitor 14 through a nonlinear inductive impedance or saturable reactor 20. The other stationary contact 18 is connected to the opposite line of the direct current circuit through a similar inductive impedance element 21. An operating coil 22 for the vibratory element 12 is connected from the stationary contact 18 to the fixed end of the vibratory element 12.

With the circuit arrangement just described, it is apparent that upon application of direct current voltage to the conductors 10, which may be accomplished through a suitable switch (not shown), the element 12 is attracted by the operating coil 22 and brought into contact with stationary contact 18. The direct current potential causes a current to flow through the nonlinear inductance 21, the stationary contact 18, movable contact 12, inductance 17, transformer winding 15 and the condenser 14. As soon as movable contact 12 comes in contact with the stationary contact 18 the operating coil is short circuited and the vibratory element 12 is free to move in a direction to engage contact 19 at which time the circuit including the capacitor 14, the primary winding 15 of the transformer 16, inductance 17 and the nonlinear inductive impedance 20 are short circuited causing the condenser to discharge and reverse the current through the transformer winding 15. The constants of the series circuit including the capacitance 14, the transformer winding 15, inductance 17 and windings 20 and 21, when saturated, are chosen so that the natural frequency of the series oscillating circuit formed thereby approaches the frequency desired in the alternating current circuit 11. The vibratory switch 13 is designed to have a natural frequency of vibration substantially equal to the desired frequency of the alternating current circuit 11 so that the driving force required is small.

In operation the movable switch element 12 is arranged to leave the stationary contact 18 before making contact with stationary contact 19 so that the alternating current circuit including the transformer winding 15 is periodically disconnected from the direct current source. Inasmuch as the current of the series oscillating circuit periodically passes through zero, it is theoretically possible to adjust the natural frequency of the circuit to the same frequency as that of the vibrating switch and have the contacts separate at zero current. As a practical matter, however, variations in voltage, in load current, and the frequency of operation of the switch as well as bouncing of the switch contacts, all make it difficult to open the contacts at the zero point in the oscillating current wave and accordingly, I provide an improved circuit in which an extended period of low current through the contacts is provided between successive half cycles of current in the oscillating circuit. This is accomplished in the arrangement shown in Fig. 1 by the saturable inductive impedance elements 20 and 21. One or the other of these windings is in circuit in either closed circuit position of the movable contact 12. The impedance elements 20 and 21 are designed to saturate at a comparatively small value of current compared to the R. M. S. value of the load current so that for the greater part of the period of oscillation of the series circuit the nonlinear impedance element is saturated and has very little effect on the magnitude of the current flowing or the period of oscillation. When the oscillating current reaches a low value the non-linear reactor desaturates and the resulting increase in impedance decreases the rate of change of current to a very considerable extent so that there is an extended period of low current during which the contacts may be opened without any appreciable sparking. Upon closing of the movable contact upon the other stationary contact the other half cycle of oscillating current starts to flow and its increase is at first retarded by the large impedance presented by the unsaturated nonlinear reactor but as soon as the current reaches a comparatively small value this reactor saturates and the oscillating current flows with a substantially sinusoidal variation and at the frequency determined by the natural frequency of the oscillating circuit. Thus it is seen that by utilization of a nonlinear reactor in series with the contacts of an inverter employing a series oscillating circuit, it is possible to provide an extended period of low current between current reversal in the oscillating circuit and operate the contacts with a minimum of sparking. Since the action of the nonlinear reactor may be looked upon as inserting in the current time cycle an additional period of low current rather than altering the natural frequency of the oscillatory circuit, it is desirable to have the oscillatory circuit tuned to a frequency slightly higher than the frequency of the vibratory switch and the alternating current of the output circuit. The reason for this will be apparent from an inspection of Fig. 5 in which the curve A represents the current variation in the oscillating circuit at the natural frequency thereof, and curve B represents the current variation in the illustrated circuits embodying the present invention. It will be noted that for the greater portion of each half wave of current the curves A and B are identical. For example, note the periods $t_1-t_2$ which are substantially identical and correspond to the portion of the cycle during which the saturable inductive reactances are saturated. At the natural frequency of oscillation the current through the contacts would reach zero at time $t_3$. However, the action of the nonlinear reactor is to decrease the rate of current change at this point and extend the period during which the current decreases to zero to the point $t_4$. Thus, it is seen that an extended period of low current is introduced between the successive half cycles of the oscillating current and this increases the time interval between the current zeros. For this reason it is desirable to operate the switching means at a frequency slightly lower than the natural period of oscillation of the oscillating circuit. It is seen from the shape of the curve B that slight variations in the time of the circuit interrupting operation of the switching means with respect to the current variation in the oscillating circuit will not require the switching means to operate under heavy current and in this way very satisfactory operation under varying operating conditions is obtained.

When supplying a load comprising electric discharge lamps with an inverter of the character illustrated in Fig. 1 it has been found that a variation of the direct current voltage tends to alter the frequency of the oscillating circuit due to the resistance characteristic of the lamps which is reflected in the series oscillating circuit through the transformer 16. The use of the saturable reactance means in the series oscillating circuit has been found to improve the operation of the inverter with varying applied D. C. voltage and to compensate to some extent for the variation in resistance reflected in the oscillating circuit.

In order to prevent short circuiting of the direct current source in the event that the vibrator moves into engagement with one of the stationary contacts before the arc is extinguished between the movable contact and the other stationary contact, the saturable reactors 20 and 21 connected in series with the stationary contacts are wound on a common core in such a direction that the initiation of current in one of the windings introduces a voltage in the other in such a direction as to oppose the flow of current therethrough, thus aiding in commutation and preventing a short circuit of the direct current source from developing if the contacts fail to interrupt the current immediately upon separation due to some abnormal or transient condition.

In Fig. 2 I have shown my invention embodied in an inverter which is very similar to that shown in Fig. 1 and like numerals have been used to designate like parts. In the arrangement shown in Fig. 2 the capacitance 14 has been replaced by two capacitors 23 and 24 which are connected in series and across the direct current circuit 10, and have a midpoint connected to the primary winding 15 of the output transformer 16. The reactor 17 has been replaced by two reactor sections 17a and 17b one of which is connected in series with each of the stationary contacts 18 and 19. The two sections 17a and 17b are coupled magnetically so that the action thereof aids commutation in the event that a short circuit on the direct current circuit tends to be established due to arcing at the contacts of the switch 13. Thus the linear reactors 17a and 17b as well as the nonlinear reactors 20 and 21 are used to eliminate the possibility of a short circuit in the arrangement of Fig. 2. The arrangement of the capacitors illustrated in Fig. 2 permits a steadier load on the direct current circuit than the circuit of Fig. 1 since they are always connected to the direct current circuit. These condensers are connected in series across the direct current circuit and selectively in series with the inductances 15, 17a and 21 or 15, 17b, and 20, according to which stationary contact is engaged, and combine therewith to form an oscillating circuit.

In Fig. 3 I have shown another embodiment of my invention which results in a more economical utilization of the capacitor 14 of the oscillating circuit. In the arrangement shown in Fig. 3 the switching means provide for the reversal of the direct current voltage applied to the series oscillating circuit synchronously with the desired output alternating voltage. In the arrangement illustrated, two vibratory switches 25 and 26 are each provided with a movable contact member 27 associated with a different one of the direct current lines 10 and stationary contacts 28 and 29. One stationary contact 28 of each switch is connected to the same terminal of the oscillating circuit including the inductance 17, primary winding 15 of the transformer 16, and the capacitor 14, while the stationary contacts 29 of each switch are connected to the opposite terminal of the oscillating circuit. Operating coils 30 are provided to operate the movable contacts in the same manner as the operating coil 22 of the switch 13 illustrated in Fig. 1. It is apparent that application of direct current voltage to the lines 10 will cause movable contact elements 27 of the switches 25 and 26 to move toward each other and engage the stationary contacts 29 and 28, respectively. The operating coils 30 are short circuited upon closure of these contacts and due to the resilience of the movable contacts, are actuated in the opposite direction into engagement with contacts 28 and 29 of the switches 25 and 26, respectively, to reverse the polarity of the direct current supplied to the operating circuit. With this arrangement the capacitor of the oscillating circuit is subjected to substantially twice the alternating voltage of the capacitor 14 of the arrangement shown in Fig. 1 for the same applied direct current voltage. Since the cost of capacitors per volt-ampere rating decreases with increases in potential rating within the range encountered in many applications of the circuit described in this application, the circuit of Fig. 3 is particularly advantageous.

In order to provide for an extended period of low current through the contacts of switches 25 and 26 between successive half cycles of current of the oscillating circuit a saturable inductive impedance element 31 is provided. In the arrangement shown the saturable reactor 31 is connected in one of the direct current lines 10. An auxiliary winding 32 wound in magnetically coupled relation with the winding 31 is provided for introducing a unidirectional magnetomotive force in the core structure of the nonlinear reactor 31 in such a direction as to oppose the magnetomotive force due to the load current flowing through the reactor 31. The winding 32 is connected across the direct current supply through a resistor 33 and an inductive impedance 34, which together determine the magnitude of, and smooth out the current flowing through the winding 32. The effect of the winding 32 is to compensate for the residual magnetism of the saturable reactor 31 and to displace the period of low current through the contacts of the vibrating switches with respect to the zero axis.

The arrangement shown in Fig. 4 is essentially the same as that disclosed in Fig. 3 with the exception of the saturable impedance device employed for producing the extended period of low current between the successive half waves of oscillating current. In the arrangement shown in Fig. 4 the saturable inductive impedance 31 has been omitted from the direct current circuit and has been replaced by a saturable inductive impedance element 35 connected in series with the stationary contacts of the vibratory switches 25 and 26 and in the alternating current circuit of the inverter.

It will be understood that the operation of the arrangement shown in Figs. 3 and 4 is similar to that described in connection with Fig. 1 with the exception that the direct current voltage supplied to the oscillating circuit is reversed by the vibratory switches 25 and 26 in synchronism with the current output voltage. The arrangement shown in these figures has been found to be particularly advantageous from the standpoint of cost of equipment per unit of electrical rating of the translating apparatus and at the same time is found to provide long life and reliable operation in service.

Although I have shown my invention embodied in an electric circuit arrangement employing vibratory switches, it will be apparent to those skilled in the art that rotating commutator type of switches or electric valve means may be employed without departing from certain aspects of my invention. It is apparent that the two switches 24 and 25 employed in the arrangements shown in Figs. 3 and 4 may be replaced by a single vibratory switch having a movable element comprising conducting segments arranged in insulated relation and cooperating with the different pairs of stationary contacts.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current supply circuit, an alternating current load circuit, electric translating apparatus interconnecting said circuits for transmitting energy therebetween comprising a series oscillating circuit and mechanical switching means for controlling the connection of said oscillating circuit across said direct current circuit, means for operating said switching means at a frequency corresponding to the frequency of said alternating current circuit, a saturable inductive reactance connected in series relation with said switching means and cooperating with said oscillating circuit when saturated to determine the natural frequencies thereof, said saturable inductive reactance being effective when unsaturated to produce an extended period of low current between successive half waves of the oscillating currents of said oscillating circuit so that the circuit interrupting operations of said switching means are accomplished during said periods of low current.

2. In combination, a direct current circuit, an alternating current circuit, electric translating apparatus interposed between said circuits for transmitting energy therebetween, said apparatus including a series oscillating circuit including an inductance and a capacitance having a natural frequency, switching means for intermittently connecting said series oscillating circuit to said direct current circuit, means for operating said switching means at a frequency corresponding to the frequency of said alternating current circuit and slightly lower than the natural frequency of oscillation of said series oscillating circuit, saturable reactance means connected in series with said switching means for producing an extended period of low current between successive half cycles of current of said oscillating circuit so that said switching means may be operated during said periods of low current to facilitate the circuit interrupting operation of said switching means.

3. In combination, a direct current supply circuit, an alternating current load circuit, and electric translating apparatus interposed between said circuits for transmitting energy therebetween comprising mechanical switching means, a series connected capacitance and inductance connected in series relation with said switching means, means for operating said switching means to connect periodically said inductance and capacitance in circuit with said direct current supply circuit, and a saturable inductive reactance connected in series relation with said switching means for decreasing the current conducted by said electric switching means immediately preceding and during the circuit interrupting operations, the inductance of said saturable reactance when saturated cooperating with said inductance and capacitance to form a series oscillating circuit having a natural frequency higher than the frequency of said alternating current circuit.

4. In combination, a direct current supply circuit, an alternating current load circuit, electric translating apparatus interconnecting said circuits including a series oscillating circuit having a natural frequency higher than the frequency of said alternating current circuit, mechanical switching means for completing a different circuit for each half cycle of oscillating current of said series circuit, nonlinear inductive impedance means connected in series with said switching means for producing an extended period of low current between successive half cycles of current in said oscillating circuit, and means for operating said switching means in accordance with the frequency of said alternating current circuit so that the circuit interrupting operations thereof are accomplished during said periods of low current, said switching means being constructed and arranged to interrupt the circuit established for one half cycle of said oscillating current before establishing a circuit for the flow of the other half cycle of said oscillating current.

5. In combination, a direct current supply circuit, an alternating current load circuit, electric translating apparatus interconnecting said circuits including a series oscillating circuit and mechanical switching means for completing a different circuit for each half cycle of current of said oscillating circuit, an inductive element in the circuit completed by said switching means for each half cycle of said oscillating current, means for operating said switching means at a frequency corresponding to the frequency of said alternating current, said switching means being so constructed and arranged that the circuit established for one half cycle of said oscillating current is interrupted before the circuit for the other half cycle of oscillating current is completed, said inductive elements being magnetically coupled and wound in such a direction that initiation of current flow in one of the elements induces a potential in the other of said elements opposing the flow of current through said other element.

6. In combination, a direct current supply circuit, an alternating current load circuit including an inductive winding, electric translating apparatus interposed between said circuits for transmitting energy therebetween including a series oscillating circuit, said oscillating circuit including a capacitance and the inductive winding of said load circuit, switching means for periodically reversing the polarity of the direct current potential applied to said oscillating circuit, means for operating said switching means at a frequency corresponding to the desired frequency of said alternating current circuit, and saturable inductive reactance means connected in series relation with the said switching means for providing an extended period of low current between successive half cycles of current flowing in said oscillating circuit so that the circuit interrupting operations of said switching means may be accomplished during said periods of low current.

7. In combination, a direct current supply circuit, an alternating current load circuit, and electric translating apparatus interposed between said circuits for transmitting energy therebetween, said apparatus including a series resonant circuit including an inductance and a capacitance, mechanical switching means interconnecting each line of said direct current circuit with a different terminal of said series resonant circuit, nonlinear inductive impedance means connected in series relation with said switching means for producing an extended period of low current between successive half cycles of current in said oscillating circuit, and means for operating said switching means to reverse the polarity of the direct current applied to said oscillating circuit in synchronism with said alternating current circuit, the natural period of oscillation of said series circuit being higher than the frequency of said alternating current circuit so that the circuit interrupting operations of said switching means are accompished during said periods of low current.

8. In combination, a direct current supply circuit, an alternating current load circuit, electric translating apparatus interconnecting said circuits for transmitting energy therebetween including a series oscillating circuit comprising an inductance and a capacitance, switching means for controlling the connection of said oscillating circuit with said direct current source, means for operating said switching means at a frequency corresponding to the frequency of said alternating current circuit, saturable inductive reactance means connected in series with said switching means for providing an extended period of low current between successive half cyles of current in said oscillating circuit, means associated with said saturable inductive reactance for producing a unidirectional magnetomotive force in the core structure of said reactance to displace said period of low current with respect to the axis of said oscillating current.

9. In combination, a direct current supply circuit, an alternating current load circuit, electric translating apparatus interposed between said circuits comprising mechanical switching means, a series resonant circuit including saturable and nonsaturable components of inductive reactance connected in series relation with said switching means, means for operating said switching means to connect periodically said series resonant circuit with said direct current supply circuit, said resonant circuit having a natural frequency higher than the frequency of operation of said switching means when the saturable component of inductive reactance is saturated, said saturable inductive reactive component being effective when unsaturated to produce extended periods of low current between successive half cycles of oscillating current during which said switching means is operated.

10. In combination, a direct current supply circuit, an alternating current load circuit, electric translating apparatus interposed between said circuits comprising mechanical switching means, a series resonant circuit including saturable and nonsaturable components of inductive reactance connected in series relation with said switching means, means for operating said switching means to reverse periodically the connections between said series resonant circuit and said direct current supply circuit, said resonant circuit having a natural frequency higher than the frequency of operation of said switching means when the saturable component of inductive reactance is saturated, said saturable inductive reactive component being effective when unsaturated to produce extended periods of low current between successive half cycles of oscillating current during which said switching means is operated.

BURNICE D. BEDFORD.